United States Patent [19]

Ugajin et al.

[11] 3,892,838

[45] July 1, 1975

[54] METHOD OF PRODUCING THERMALLY STABLE URANIUM CARBONITRIDES

[75] Inventors: Mitsuhiro Ugajin; Ichiro Takahashi, both of Ibaragi, Japan

[73] Assignee: Japan Atomic Energy Research Institute, Tokyo, Japan

[22] Filed: Oct. 12, 1972

[21] Appl. No.: 296,851

[30] Foreign Application Priority Data

Oct. 16, 1971 Japan.................................. 46-81762

[52] U.S. Cl............ 423/253; 252/301.1 R; 423/256
[51] Int. Cl............................................. C01g 43/00
[58] Field of Search....... 252/301.1 R; 423/253, 256

[56] References Cited
UNITED STATES PATENTS

| | | |
|---|---|---|
| 3,202,586 | 8/1965 | Webb et al. .................... 423/256 X |
| 3,211,664 | 10/1965 | Endebrock................... 252/301.1 R |
| 3,232,717 | 2/1966 | Hill et al. ................. 252/301.1 R X |
| 3,238,140 | 3/1966 | Hedger et al. ............... 252/301.1 R |
| 3,284,550 | 11/1966 | Riley et al................ 252/301.1 R X |
| 3,306,957 | 2/1967 | McLaren...................... 252/301.1 R |
| 3,332,883 | 7/1967 | Norreys....................... 252/301.1 R |
| 3,661,709 | 5/1972 | Chubb et al. ............ 252/301.1 R X |
| 3,708,433 | 1/1973 | Leitnaker et al............. 252/301.1 R |

*Primary Examiner*—Richard D. Lovering
*Assistant Examiner*—R. E. Schafer
*Attorney, Agent, or Firm*—Stevens, Davis, Miller & Mosher

[57] ABSTRACT

A thermally stable uranium carbonitride can be produced by adding tungsten and/or molybdenum in the amount of 0.2 wt % or more, preferably 0.5 wt % or more, to a pure uranium carbonitride.

2 Claims, No Drawings

METHOD OF PRODUCING THERMALLY STABLE URANIUM CARBONITRIDES

BACKGROUND OF THE INVENTION

1. Field of the Invention

This invention relates to a method of producing a thermally stable uranium carbonitride. More particularly, this invention relates to a method of producing a uranium carbonitride which does not or does not tend to decompose and is thermally stable, characterized by adding tungsten and/or molybdenum in the amount of 0.2 wt % or more, preferably 0.5 wt % or more, a pure uranium carbonitride.

2. Description of the Prior Art

Pure uranium carbonitrides tend to decompose at high temperatures in vacuum. The decomposition is accompanied by the release of nitrogen, which results in the formation of liquid uranium metal. The reaction thereof can be expressed as follows:

$$UN \rightarrow U\ (liquid) + 0.5\ N_2 \uparrow (gas)$$

wherein, UN is uranium nitride which is dissolved in the uranium carbonitride. The existence of metallic uranium is not desirable since it promotes swelling of the uranium carbonitride, a reactor fuel, caused by the irradiation and gives adverse effects to a stainless steel cladding materials.

No attempts have been made nor been reported in the literature to improve the thermal stability of uranium carbonitrides. Theoretically, it is possible to suppress the decomposition of uranium carbonitrides by having applied a higher partial pressure of nitrogen than the decomposition pressure depending on temperature. However, it is believed to be almost impossible, in practice, to do so while a nuclear reactor is operating.

Japanese Application No. 69970/1969, as reported by the present inventors, discloses a method of producing a stable uranium carbonitride which does not weaken a stainless steel cladding material. According to the method, uranium dicarbide, a by product which lowers the compatibility with the stainless steel, is fixed as $UMeC_2$ (wherein Me is W or Mo) by the tungsten or molybdenum addition and, therefore, the detrimental effect of uranium dicarbide will be nullified. But the above method has a disadvantage in that the uniformity of dispersion of said fissile material may be decreased and the fuel fissile density, i.e. the density of uranium in the reactor fuel, will be lowered since U (C, N), produced according to the above method, contains a carbide complex, namely $UMeC_2$.

SUMMARY OF THE INVENTION

The present inventor has developed a method of producing a uranium carbonitride fuel, a desirable reactor fuel, which does not easily decompose and does not substantially contain $UMeC_2$. The uranium carbonitride, produced according to the method of this invention, contains neither uranium dicarbide nor uranium metal, and, therefore, the problems as to the compatibility of same with a stainless steel material and the behavior thereof under irradiation are thought to be negligible.

The object of the present invention is, by producing a uranium carbonitride which neither contains uranium dicarbide nor uranium metal and simultaneously strengthening the crystal structure thereof, to remove the thermal instability or a uranium carbonitride, i.e. the thermal decomposition thereof. That is to say, the object of the invention is to provide a method of producing a thermally stable uranium carbonitride by incorporating tungsten or molybdenum in the crystal lattice of the uranium carbonitride. In another aspect, the present invention relates to an improvement of the thermal stability of uranium carbonitrides. The chemical formula of uranium carbonitrides can be expressed as $UC_{1-x}N_x$ ($0 < x < 1$) and those compounds are suitable for nuclear reactor fuels. However, since the compounds consist of the solid solution of uranium carbide (UC) and uranium nitride (UN), they still retain the disadvantage, thermal decomposition, that is inherent in uranium nitride. Although said disadvantage may be decreased by dissolving uranium carbide in uranium nitride and, as the result, forming uranium carbonitride, the compound is yet thermally unstable as previously mentioned. Nitrogen, accordingly uranium nitride, cannot be contained in reactor fuels in a large amount from the viewpoint of economy of a neutron flux. In practice, a compound, $UC_{1-x}N_x$, wherein $x$ is about or less than 0.4 will be admitted as a reactor fuel. Even such a compound as is within the scope of the above composition is, however, recognized to decompose.

DETAILED DESCRIPTION OF THE INVENTION

The present invention relates to a method of producing a uranium carbonitride in which a mixture of uranium metal and graphite or uranium carbide (UC) which are added with tungsten and/or molybdenum as a metal-providing component is used as a starting material and the final product, uranium carbonitride, contains elementary metal dissolved in the matrix. Unexpectedly, the present inventors found that the final product obtained according to the present method is very stable for temperature compared with pure uranium carbonitrides of the prior art. The method of this invention comprises the steps of; arc-melting the above materials under nitrogen atmosphere to obtain a uranium carbonitride which neither contains uranium dicarbide nor uranium metal and simultaneously dissolving in a short time tungsten or molybdenum in the uranium carbonitride utilizing the high temperature achieved by the melt of the materials. For the addition of the above metals, the elements or the carbides thereof are conveniently used.

In the preparation of a uranium carbonitride which contains neither uranium dicarbide nor uranium metal, the following relation is found to be established between the composition, temperature of the molten materials (T°K) and the partial pressure of nitrogen, $$\log P_{N_2}\ (atm.) = \log P_{N_2}' + 2 \log X + \frac{1440}{T}(1-x)^2 + 3.15\left(\frac{3100}{T} - 1\right)$$

wherein $$\log P_{N_2}'\ (atm.) = 8.193 - 29.54 \times 10^3/T + 6.5 \times 10^{-18}T^5$$

The above formula can be used when a tungsten or a molybdenum component exists in a relatively small amount in the matrix. According to the formula, one skilled in the art can easily determine the partial pressure of nitrogen to apply in practising the method of the present invention.

In the preferred embodiments of the present invention, the melting of the starting materials are effected at a temperature ranging from about 2,800°k to 3,200°k under a partial pressure of nitrogen lower than 1 atm. ($0 < P_{N_2} < 1$).

For a further detailed explanation of this invention, the following examples are given, The examples are shown as a part of the preferred embodiments of the invention, and are not intended to limit the scope of the invention. Modifications and variations thereof can, of course, be made within the technical idea and the scope of this invention. Obviously one skilled in the art can appropriately modify the examples in accordance with the purpose and the equipment when he practises the invention.

Examples 1 – 7

The vacuum arc-furnace herein used is a commercial available one having a water-cooled tungsten electrode as a cathode and a water-cooled capper hearth as an anode. In either example, the amounts of uranium metal plates, carbon rods and tungsten (or molybdenum) wire were calculated and weighed to make the total amount thereof about 20 g. The materials were placed in the arc-furnace. After the furnace was evacuated, nitrogen was admitted into the furnace to give a desirable partial pressure therefor (about 0.05 atm.) and a suitable pressure of argon (about 0.65 atm.) was also added in order to give a conducting medium for arc current. In such an atmosphere, the materials were kept in the molten state for about 1 minute with a negative current of about 250A at a negative voltage of about 20V after they were preheated with about 90–150A at about 15V for about 30 seconds. Then decreasing the electric power, the materials were heated for 40 seconds, and, finally, the power was cut off and the arc-melting was finished. After those steps, the mass of the materials placed in the arc-furnace was turned upside down and the above steps were repeated. In one process, the materials were turned upside down seven times. Various materials were melted in accordance with the above process, and the results thereof are listed in Table 1. Moreover, in order to examine the thermal stability of the molten products thus obtained, the molten specimens were heated at 1900°C for 5 hours in a resistance furnace under a vacuum of about $10^{-6}$ mmHg. The specimens were cooled to room temperature in about 2 hours. The chemical compositions and the solid phases of the molten specimens before and after the vacuum heat treatment are also listed in Table 1, together with the change in composition of the specimens. The above results were obtained by metallographic observation through a photomicroscope, chemical analysis, electron-microprobe analysis and X-ray analysis.

It was revealed by electron-microprobe analysis that, in a molten product in which tungsten or molybdenum are incorporated, either of the metals is dissolved in the crystal lattice of uranium carbonitride at least up to about 2 weight percent. In Table 1, $UC_{1-x}N_x$ [W] or $UC_{1-x}N_x$ [Mo] as denoted defines a uranium carbonitride in which tungsten or molybdenum is dissolved. It was observed that an excess of tungsten or molybdenum metal precipitated in a uranium carbonitride matrix saturated with tungsten or molybdenum. The amounts of oxygen contained in the molten products were 0.008 to 0.02 weight percent.

Table 1

| Exp. No. | Metal additive (Me) | Melting condition | | | | | Molten product | | | | | | | | |
|---|---|---|---|---|---|---|---|---|---|---|---|---|---|---|---|
| | | Materials (mole ratio) | | | Atmosphere (atm.) | | Chemical composition* | | | | | | | | |
| | | | | | | | Weight % | | | | Atomic % | | | | Phase |
| | | U | C | Me | $N_2$ | Ar + $N_2$ | U | C | N | Me | U | C | N | Me | |
| 1 | — | 1 | 0.89 | — | 0.05 | 0.7 | 95.09 | 4.3 | 0.61 | 0.04 | 50.1 | 44.5 | 5.4 | — | $UC_{1-x}N_x(x \approx 0.1)$ |
| 2 | W | 1 | 0.89 | 0.005 | 0.05 | 0.7 | 94.52 | 4.3 | 0.58 | 0.6 | 49.6 | 44.8 | 5.2 | 0.4 | $UC_{1-x}N_x[W](x \approx 0.1)$ |
| 3 | W | 1 | 0.89 | 0.011 | 0.05 | 0.7 | 94.22 | 4.2 | 0.58 | 1.0 | 49.6 | 43.9 | 5.2 | 1.3 | $UC_{1-x}N_x[W](x \approx 0.1)$ |
| 4 | W | 1 | 0.89 | 0.071 | 0.05 | 0.7 | 90.11 | 4.07 | 0.52 | 5.3 | 48.3 | 43.3 | 4.7 | 3.7 | $UC_{1-x}N_x[W](x \approx 0.1) + W$ |
| 5 | Mo | 1 | 0.89 | 0.02 | 0.05 | 0.7 | 94.5 | 4.2 | 0.6 | 0.7 | 49.8 | 43.9 | 5.4 | 0.9 | $UC_{1-x}N_x[Mo](x \approx 0.1)$ |
| 6 | Mo | 1 | 0.89 | 0.03 | 0.05 | 0.7 | 94.05 | 4.16 | 0.59 | 1.2 | 49.6 | 43.5 | 5.3 | 1.6 | $UC_{1-x}N_x[Mo](x \approx 0.1)$ |
| 7 | Mo | 1 | 0.89 | 0.071 | 0.05 | 0.7 | 92.62 | 4.24 | 0.54 | 2.6 | 48.3 | 43.5 | 4.8 | 3.4 | $UC_{1-x}N_x[Mo](x \approx 0.1) + Mo$ |

| Exp. No. | Molten product subjected to a vacuum heat treatment | | | | | | | | | |
|---|---|---|---|---|---|---|---|---|---|---|
| | Chemical composition* | | | | | | | | Phase | $\Delta(N/U)^{**}$ |
| | Weight % | | | | Atomic % | | | | | |
| | U | C | N | Me | U | C | N | Me | | |
| 1 | 95.30 | 4.26 | 0.44 | — | 50.9 | 45.1 | 4.0 | — | $UC_{1-x}N_x + U$ | −0.030 |
| 2 | 94.50 | 4.1 | 0.6 | 0.8 | 50.5 | 43.5 | 5.4 | 0.6 | $UC_{1-x}N_x[W]$ | +0.003 |
| 3 | 93.72 | 4.11 | 0.57 | 1.6 | 50.1 | 43.6 | 5.2 | 1.1 | $UC_{1-x}N_x[W]$ | −0.002 |
| 4 | 90.05 | 4.10 | 0.55 | 5.3 | 48.0 | 43.3 | 5.0 | 3.7 | $UC_{1-x}N_x[W] + W$ | +0.007 |
| 5 | 94.6 | 4.3 | 0.6 | 0.5 | 49.4 | 44.6 | 5.3 | 0.7 | $UC_{1-x}N_x[Mo]$ | −0.002 |
| 6 | 94.34 | 4.1 | 0.56 | 1.0 | 50.2 | 43.4 | 5.1 | 1.3 | $UC_{1-x}N_x[Mo]$ | −0.006 |
| 7 | 92.57 | 4.16 | 0.57 | 2.7 | 48.4 | 43.1 | 5 | 3.5 | $UC_{1-x}N_x[Mo] + Mo$ | +0.004 |

*%U = 100 − (%C + %N + %Me)

**$\Delta(N/U) = \left\{\begin{array}{l}\text{N/U of a specimen after} \\ \text{the vacuum heat treatment}\end{array}\right\} - \left\{\begin{array}{l}\text{N/U of a specimen before} \\ \text{the vacuum heat treatment}\end{array}\right\}$ In Table 1, Example 1 is a comparative one, in which tungsten or molybdenum was not added to the starting materials. However, the molten specimen thereof contains about 0.06 weight percent of tungsten owing to the contamination that comes from the tungsten electrode used herein. The above example discloses that, by subjecting to said vacuum heat treatment, the specimen $UC_{1-x}N_x$ decomposes which results in containing itself metallic uranium as a decomposition product. The change in chemical composition thereof shows that the production of uranium metal is caused by the vaporization of nitrogen component in the above $UC_{1-x}N_x$ preferentially rather than uranium component. In Examples 2 – 4 and 5 – 7, tungsten and molybdenum, respectively, were incorporated in the specimens. It was revealed that, in either case, the decomposition of each specimen of $UC_{1-x}N_x$ ($x \approx 0.1$) did not take place by the vacuum heat treatment. That is, the uranium metal which is produced by the decomposition is not detected by photo-microscope observation and electron-microprobe analysis. Moreover, the changes in chemical compositions of those specimens owing to the vacuum heat treatment were within the scope of experimental error. Also the molten specimens of Examples 2 – 7 did not decompose under similar vacuum heat treatment at 2000°– 2100°C.

As is apparent from Table 1, according to the nitrogen melting method applied in this invention, a part of all of the tungsten or molybdenum in the starting materials was dissolved in an uranium carbonitride matrix simultaneously when the matrix is formed. The uranium carbonitride thus obtained neither thermally decomposes nor contains $UMeC_2$ and can be used as a stable reactor fuel. The coexistence of tungsten or molybdenum metal as a second phase with the uranium carbonitride does not bring about any disadvantages in stability. Preferably, the addition of these elements should be not so much since too much addition thereof makes the preparation of the uranium carbonitride difficult and the fuel fissile density low.

In addition to the above specimens, the product $UC_{1-x}N_x$ [Me] wherein $x$ is less than about 0.4 ($0 < x < 0.4$) can be also obtained in accordance with the present invention. The amount of the metal dissolved in the matrix is up to about 3 weight percent.

Moreover, helium may be used, in place of argon, as a conducting medium in the arc-furnace.

What we claim is:

1. A process for producing a thermally stable uranium carbonitride which comprises
    adding to a material selected from the group consisting of uranium carbide and a mixture of uranium and carbon
    a metal selected from the group consisting of tungsten, molybdenum and mixtures thereof in an amount of 0.2 to 5.3 weight percent of said metal based upon the produced uranium carbonitride;
    melting the resulting mixture under the pressure of nitrogen to insure no yield of uranium dicarbide or uranium metal, and
    producing a resulting uranium carbonitride containing at least a part of said metal dissolved in the matrix.

2. The process of claim 1 wherein said carbon is graphite.

* * * * *